Figure 13:
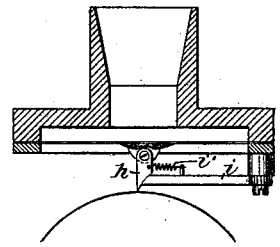

(No Model.) 3 Sheets—Sheet 1.
T. A. EDISON.
METHOD OF RECORDING AND REPRODUCING SOUNDS.
No. 393,966. Patented Dec. 4, 1888.
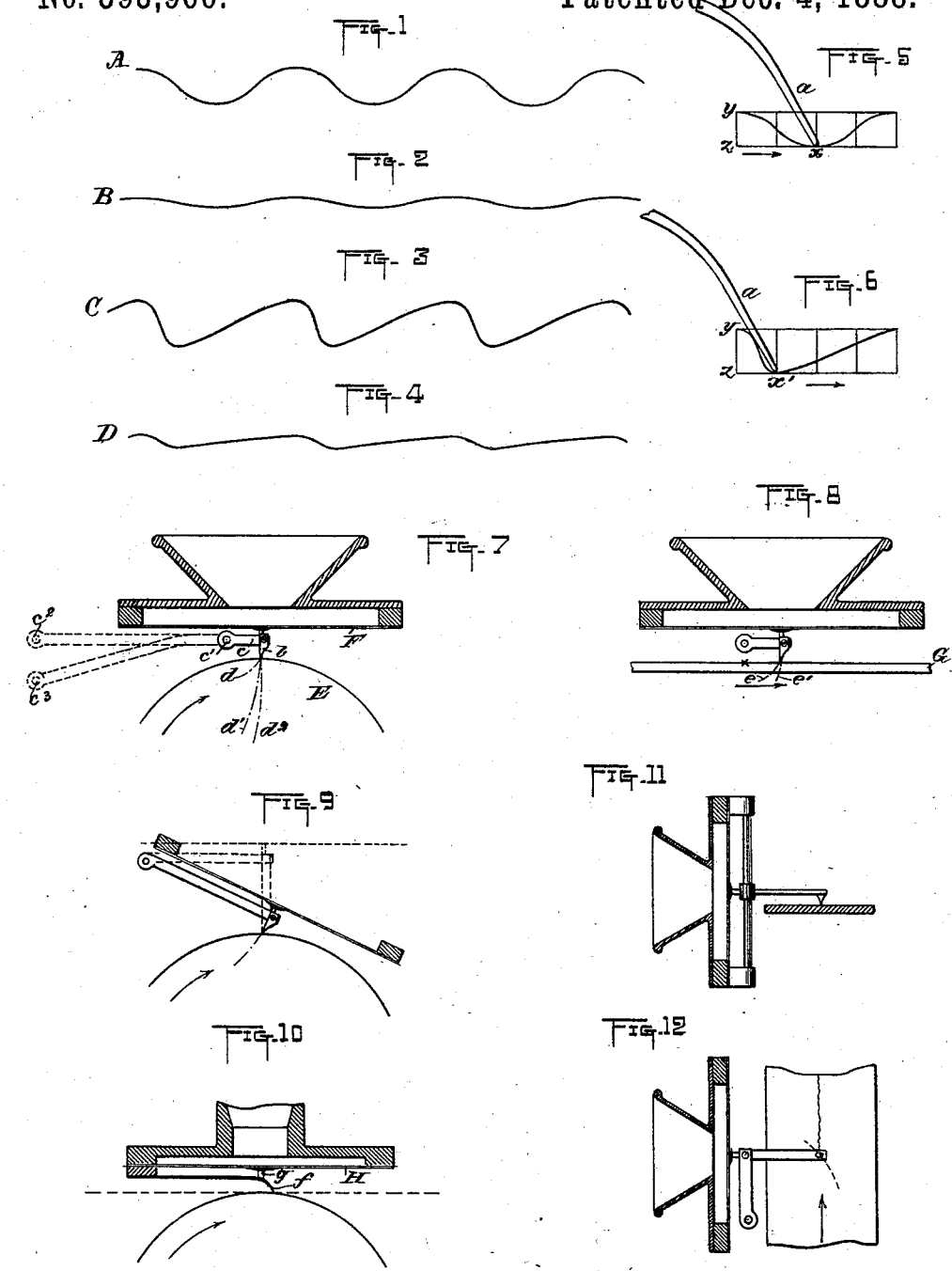
WITNESSES:
INVENTOR,
Thomas A. Edison.
BY Dyer & Seely
ATTORNEY (No Model.) 3 Sheets—Sheet 2.

T. A. EDISON.
METHOD OF RECORDING AND REPRODUCING SOUNDS.

No. 393,966. Patented Dec. 4, 1888.

(No Model.) 3 Sheets—Sheet 3.

T. A. EDISON.
METHOD OF RECORDING AND REPRODUCING SOUNDS.

No. 393,966. Patented Dec. 4, 1888.

WITNESSES:

INVENTOR,
Thomas A. Edison,
BY
Dyer & Seely,
ATTORNEYS

UNITED STATES PATENT OFFICE.

THOMAS A. EDISON, OF LLEWELLYN PARK, NEW JERSEY.

METHOD OF RECORDING AND REPRODUCING SOUNDS.

SPECIFICATION forming part of Letters Patent No. 393,966, dated December 4, 1888.

Application filed July 17, 1888. Serial No. 280,204. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in the Art of Recording and Reproducing Sounds, (Case No. 786,) of which the following is a specification.

As is well understood, the phonograph invented by me, and the various modifications of my early instruments that have been made by others as well as by myself, operate to record speech, music, and other sounds by impressing a solid or semi-solid material with wave-lines corresponding with the sound-waves, the sounds being reproduced from these recorded wave-lines by causing them to vibrate an elastic solid, such as a diaphragm.

To illustrate by reference to a usual form of the apparatus, a diaphragm carrying an indenting-point is held so that the point will form a groove in the surface of a moving body of suitable material, such as a cylinder of wax. The vibrations of the diaphragm cause the indenting-point also to vibrate and to correspondingly vary the depth of the groove, thus forming the wave-line, from which the sound is reproduced by drawing the surface again under the same or a different point attached to a diaphragm.

All phonographs heretofore made have been unsatisfactory in the respect that they lacked clearness and loudness of articulation. This I have found is due more particularly to the fact that they failed to bring out clearly the hissing sounds, thus making words which depend upon such sounds for their characteristics generally unintelligible, except by aid of the context. An examination of such phonograph-records microscopically shows that the recorded waves are symmetrical in shape, each wave rising and falling on the same gradual sinuous curve. The waves for the hissing sounds also appear longer and of less depth, and hence more gradual in their rise and fall, than those for vowel sounds.

In my investigations and experiments with telephonic apparatus of various kinds I have observed that the loudness of the sound produced in a telephone-receiver by a current impulse is dependent upon the sharpness of the impulse rather than upon its strength. The circuit from a hundred cells of battery can be closed through a telephone-receiver without producing sound, providing the wave is made one having a gradual and uniform rise by placing a suitable magnet in the circuit to taper the wave by its self-induction, while a sharp impulse from a single cell will produce a noise in the receiver which can be heard for some distance. Hence I have concluded that the imperfection of phonograph-records arises from the symmetrical and gradual rise and fall of the recorded waves, and especially of the recorded waves representing hissing sounds, which do not move the reproducing-diaphragm with sufficient abruptness to reproduce the sound-waves with clearness. To overcome this difficulty I modify the form of the recorded waves, so that instead of being a simple sinusoidal symmetrical curve with the greatest depth at the center of each recorded wave, the recorded waves will be more abrupt at one end than at the other. This I accomplish by controlling the movement of the recording-point with reference to the relative movement of such point and the recording-surface. Instead of acting perpendicular to the line of advancing movement, the recording-point moves oblique to such line, so that in one direction the recording-point moves to some extent with the recording-surface and in the other direction such point moves to some extent against or opposite to the movement of the recording-surface. By regulating these relative movements I have found that the recorded waves can be given the desired abruptness at one end—*i. e.*, the point of greatest depth of the recorded wave can be transferred from the center of the wave to near either end. I have found it preferable to make this abruptness at the end rather than at the beginning of each wave, since in the former case the reproducing-point passes down the gradually-declining side of the wave to its extreme depth, and then rises suddenly at the end of the wave without producing audible disturbances of the recorded sound, while in the former case false sounds are produced, which I attribute to the jumping of the reproducing-point off of the abrupt corner of the recorded wave and its striking the bottom of the wave with sufficient force to rebound, making false vibrations which are audible.

This invention of modifying the form of the recorded waves, so as to give abrupt movements of the reproducing-point, is capable of being carried out in practice in a great variety of ways, a few only of which are shown by the drawings for purposes of illustration, and these, for clearness, are shown principally in diagram, the general features of the apparatus being well understood.

Figures 1 and 2 represent on an exaggerated scale, respectively, the form of the recorded waves for vowels and hissing sounds in phonograph-records heretofore produced. Figs. 3 and 4 represent on an exaggerated scale the form of the recorded waves for vowels and hissing sounds produced by the employment of this invention. Figs. 5 and 6 are views illustrating the dynamic effects of the pure and modified waves. Fig. 7 is a view, principally in diagram, illustrating a suitable arrangement for the recorder indenting-point, with dotted lines to show the effect of changing the location of the pivot of the lever which carries such indenting-point. Fig. 8 is a view similar to Fig. 7, but showing a flat instead of a cylindrical recording-surface. Fig. 9 is a view illustrating the accomplishment of the same end by arranging the recorder oblique to the recording-surface. Fig. 10 is a view illustrating the use of a reproducer with records such as would be produced by the arrangements of Figs. 7, 8, and 9. Figs. 11 and 12 are a vertical section and top view, respectively, of a recorder acting parallel with the recording-surface and employing this invention. Figs. 13 to 16, inclusive, are views in vertical section of other forms of the recorder adapted to carry out the invention, and Fig. 17 is a vertical section of a slightly-different reproducer from that shown in Fig. 10.

The sinuous line A, Fig. 1, represents the recorded wave-line heretofore produced in phonographs for vowel sounds. It will be observed that the waves have the greatest depth at the center of their length, and that they rise symmetrically in each direction from the central point. The sinuous line B, Fig. 2, is a similar representation of the wave-line for hissing sounds and on the same scale. It will be seen that these waves also have their greatest depth at their centers, but that they are longer and have less depth than the waves for vowel sounds, and hence are much more gradual. Since the loudness of the sounds produced by the phonograph-reproducer depends upon the sharpness of the impulses, it is evident that these hissing sounds will be very feeble. In fact, in many cases they are not audible at all, and words depending on them for their characteristics are not reproduced with clearness of articulation.

Now it will be seen that if the form of the waves in recording is changed, so as to transfer the point of greatest depth from the center to near the end of each wave, the impulse produced by the recorded waves in the passing of the reproducing-point over them will be greatly sharpened. The lines C and D, Figs. 3 and 4, represent recorded waves of this modified character and such as are produced by the employment of this invention.

The difference in the action of the gradual and abrupt waves I suppose to be explained by the application of the simple laws of dynamics. In Fig. 5, which shows a pure wave-record, the reproducing-point $a$ is lifted the distance $y\ z$ while the recording-surface is traveling the distance $x\ z$. In Fig. 6, which shows a modified or sharpened wave-record, the reproducing-point is lifted the same distance, $y\ z$, while the recording-surface is traveling the shorter distance, $x'\ z$. Assuming the same rate of travel for the recording-surfaces, the distance $x'\ z$ being one-half of $x\ z$, it will be seen that in the second case double the energy will be exerted in lifting the recording-point the same distance, and hence, without increasing the depth of the waves, the sound effects are increased.

To modify the recorded waves and make them different in form from the sound-waves producing the record by making them abrupt at one end, I control the relations between the recording-point and the recording-surface. I find that by giving the parts such a relation that the reciprocating movements of the indenting-point are oblique to the line of movement of the recording-surface, rather than substantially perpendicular to it, the proper effect is produced, the greater the degree of obliquity the more abrupt being the recorded waves, the greatest depth of each wave being moved nearer to the end of the wave. This may be done in a variety of ways by fixing the location of the pivot of the lever carrying the indenting-point and by changing the angular position of the recorder.

In Fig. 7 the recording-surface E is represented as a revolving cylinder. The recorder-diaphragm is shown at F. The recording-point $b$ is connected with the center of the diaphragm, and is mounted on a lever, $c$, pivoted at the point $c'$. This lever is short and its pivot is located above the indenting-point, considering the recording-point as acting on the top of the recording-surface. The direction of movement of the indenting-point is represented by the line $d$. It will be seen that as the point moves forward into the recording-surface it will advance against the movement of the surface and the effect will be a prolongation of the first part of the recorded wave, while when the point retracts it will move with the surface and the effect will be to shorten and make abrupt the second part of the recorded wave. If the lever $c$ were pivoted at $c^2$, the movement of the indenting-point would be as represented by line $d'$. If the pivot were at $c^3$, the movement of the point would be represented by line $d^2$. Either of these two latter movements of the indenting-point would be substantially perpendicular to the recording-surface and the desired modification of the wave-record would not be produced. The point-carrying lever should be short and have its pivot within the edge of the diaphragm, and the pivots should also be above the point to secure the proper results, or the equivalent of these conditions should be secured. The shorter the lever and the farther the distance of the pivot above the point the more oblique will be the movement of the point. The proper conditions can be obtained by advancing in either of these directions—i. e., if the pivot is put a sufficient distance above the point, the lever may be longer and may extend beyond the diaphragm, while if the lever is made exceedingly short the distance of the pivot above the point may be greatly lessened. The effect of bringing the pivot into the same plane as the point is shown in Fig. 7 by the line $d^2$ and in Fig. 8 by the line $e'$. In Fig. 8 the same arrangement is illustrated as in Fig. 7, with the exception that a flat recording-surface, G, is shown instead of the cylinder. The line of movement of the recording-point is shown at $e$, while if the pivot of the lever should be located at the recording-surface at the point marked by a cross the line of movement of the recording-point would be, as at $e'$, substantially perpendicular to the recording-surface, and hence not effective for the purposes of my invention. By changing the angular position of the diaphragm with relation to the recording-surface a long lever carrying the indenting-point can be employed, as shown in Fig. 9; but this is obviously equivalent to placing the pivot farther above the point, as shown by the dotted lines in this figure.

The reproducer, Fig. 10, may be a fine wire point, $f$, connected with the diaphragm H by a solid block of india-rubber, $g$. The reproducing-point is bent downwardly into an inclined position, and is adapted to follow the records produced by the recorders of Figs. 7, 8, and 9.

In Figs. 11 and 12 is illustrated the use of the invention with recorders having points reciprocating in the plane of the recording-surface, instead of in a plane perpendicular to such surface.

Figure 14:
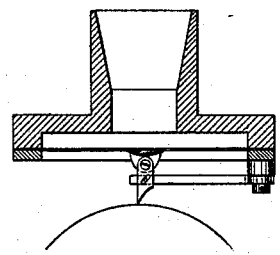

In Fig. 13 the recording-point $h$ is pivoted to the center of the diaphragm. A rigid arm, $i$, projecting from the ring or frame of the recorder, rests at its end against the beveled side of the recording-point, which is held against the arm by a spring, $i'$. This arrangement, it will be seen, will give the recording-point a movement oblique to the recording-surface. In Fig. 14 the same object is accomplished by connecting the rigid arm with the indenting-point by a pin and oblique slot.

Figure 15:
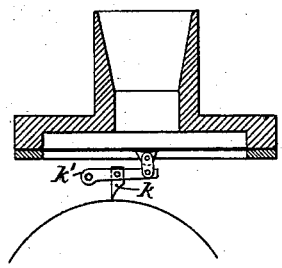

In Fig. 15 the recording-point $k$ is mounted upon the carrying-lever $k'$, between the pivot of the lever and its connection with the diaphragm.

Figure 16:
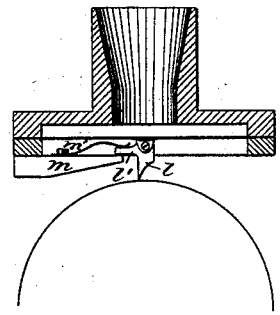
Figure 17:
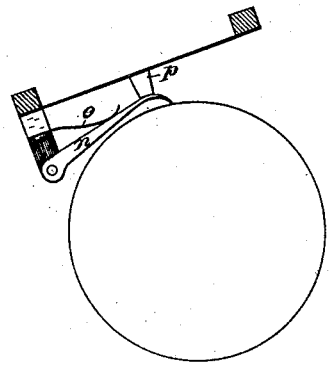

In Fig. 16 the recording-point $l$ is pivoted on the diaphragm and has a tail-piece, $l'$, which rests on a rigid arm, $m$, against which it is held by a spring, $m'$.

In Fig. 17 the reproducer, instead of having for its point a spring-wire, as in Fig. 10, has such point formed on the end of a pivoted lever, $n$, thrown forward by a spring, $o$, which keeps the diaphragm under tension. The lever $n$ is connected with the center of the diaphragm by a solid block, $p$, of india-rubber, cork, or other suitable material.

The improvement in the art hereinbefore explained removes the element of uncertainty which has heretofore existed in the construction of phonographs, and enables successful phonographs to be made of an endless variety in design and differing widely in detail, which has not heretofore been possible, since the correct principle of construction has not before been known.

What I claim is—

1. The improvement in the art of recording sounds for reproduction, consisting in impressing a suitable recording-surface with waves corresponding with the sound-waves, but made abrupt at one end, substantially as set forth.

2. The improvement in the art of recording sounds for reproduction, consisting in impressing a suitable recording-surface with waves corresponding with the sound-waves, but made abrupt at the last end of the waves, substantially as set forth.

3. The improvement in the art of recording sounds for reproduction, consisting in vibrating an indenting-point correspondingly with the sound-waves, but oblique to the relative line of movement of the recording-surface, whereby the recorded waves will be more abrupt at one end than at the other, substantially as set forth.

4. The improvement in the art of recording sounds for reproduction, consisting in vibrating an indenting-point correspondingly with the sound-waves, but oblique to the relative line of movement of the recording-surface, the oblique movement being such that the indenting-point moves forward against the movement of the recording-surface and backward with such movement, whereby the recorded waves will be more abrupt at their end than at their beginning, substantially as set forth.

5. The improvement in the art of reproducing sounds, which consists in the employment of actuating-waves that are more abrupt at one end than at the other, substantially as set forth.

This specification signed and witnessed this 14th day of July, 1888.

THOS. A. EDISON.

Witnesses:
WILLIAM PELZER,
A. W. KIDDLE.